(12) United States Patent
Jiang et al.

(10) Patent No.: US 11,929,634 B2
(45) Date of Patent: Mar. 12, 2024

(54) DC MICRO-GRID SYSTEM, CHARGING LOOP CIRCUIT AND CONTROL METHOD THEREOF

(71) Applicant: Gree Electric Appliances, Inc. of Zhuhai, Guangdong (CN)

(72) Inventors: Shiyong Jiang, Guangdong (CN);
Xiang Zhang, Guangdong (CN);
Chongyang Feng, Guangdong (CN);
Ningning Chen, Guangdong (CN);
Meng Li, Guangdong (CN); Yu Zhang, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 592 days.

(21) Appl. No.: 17/261,916

(22) PCT Filed: Dec. 19, 2018

(86) PCT No.: PCT/CN2018/121908
§ 371 (c)(1),
(2) Date: Jan. 21, 2021

(87) PCT Pub. No.: WO2020/019643
PCT Pub. Date: Jan. 30, 2020

(65) Prior Publication Data
US 2021/0305836 A1    Sep. 30, 2021

(30) Foreign Application Priority Data
Jul. 25, 2018  (CN) .......................... 201810829219.0

(51) Int. Cl.
*H02J 7/00*  (2006.01)

(52) U.S. Cl.
CPC ........ *H02J 7/00714* (2020.01); *H02J 7/0029* (2013.01); *H02J 7/007182* (2020.01)

(58) Field of Classification Search
CPC .. H02J 50/12; H02J 50/70; H02J 50/90; H02J 50/60; H02J 50/80; H02J 50/50; H02J 7/0047; H02J 7/00304; H02J 7/35; H02J 50/10; H02J 7/00034; H02J 7/00045; H02J 7/0029; H02J 7/00309; H02J 2300/28; H02J 2310/48; H02J 7/34; H02J 50/502; H02J 7/0016; H02J 7/345; H02J 50/005; H02J 50/05; H02J 50/402; H02J 50/40; H02J 7/0024; H02J 50/001; H02J 7/0019;
(Continued)

(56) References Cited

U.S. PATENT DOCUMENTS

2014/0198545 A1  7/2014 Lawson et al.
2014/0361626 A1  12/2014 Despesse
(Continued)

FOREIGN PATENT DOCUMENTS

CN   204376509 U   6/2015
CN   105826909 A   8/2016
(Continued)

*Primary Examiner* — Binh C Tat
(74) *Attorney, Agent, or Firm* — The Webb Law Firm (57) ABSTRACT

Provided by the present application are a Direct Current (DC) micro-grid system, a charging loop circuit and a control method thereof. The charging loop circuit selectively connects a charging loop to a first side loop or a second side loop through a set of switches.

19 Claims, 4 Drawing Sheets performing voltage sampling or current sampling on the first side loop by a first side sampling circuit of the converter, and performing voltage sampling or current sampling on the second side loop by a second side sampling circuit of the converter — S601 controlling the set of switches to connect the charging loop to the first side loop by a control circuit of the converter if it is detected that the first side loop is powered on and the second side loop is powered off — S602 controlling the set of switches to connect the charging loop to the second side loop by the control circuit of the converter if it is detected that the first side loop is powered off and the second side loop is powered on — S603

(58) Field of Classification Search
CPC ........ H02J 7/0014; H02J 7/0025; H02J 7/342;
H02J 1/102; H02J 50/20; H02J 50/30;
H02J 7/00; H02J 7/0031; H02J 7/1423;
H02J 7/24; H02J 1/106; H02J 2207/20;
H02J 2310/40; H02J 3/322; H02J 50/15;
H02J 7/0013; H02J 7/0018; H02J 7/0045;
H02J 7/0048; H02J 7/00712; H02J 15/00;
H02J 2207/40; H02J 2300/10; H02J
2300/24; H02J 2300/26; H02J 2310/23;
H02J 3/32; H02J 3/381; H02J 3/388;
H02J 3/46; H02J 50/23; H02J 7/0042;
H02J 7/0044; H02J 7/00714; H02J
7/007182; H04L 67/12; H04L 63/0272;
H04L 12/2814; H03H 7/40
USPC .................................................. 320/161–167
See application file for complete search history.

(56) References Cited

U.S. PATENT DOCUMENTS

| 2015/0070952 | A1 | 3/2015 | Ishii et al. |
| 2015/0280566 | A1* | 10/2015 | Chang ................... H02M 3/156 323/282 |
| 2015/0349649 | A1* | 12/2015 | Zane .................... H02M 3/1584 363/21.03 |
| 2016/0006272 | A1* | 1/2016 | Greening ............ H02J 7/00047 320/162 |

FOREIGN PATENT DOCUMENTS

| CN | 108832695 A | 11/2018 |
| CN | 208539613 U | 2/2019 |
| KR | 1020170033644 A | 3/2017 |

* cited by examiner

DC MICRO-GRID SYSTEM, CHARGING LOOP CIRCUIT AND CONTROL METHOD THEREOF

CROSS-REFERENCE TO RELATED APPLICATIONS

This application is the United States national phase of International Application No. PCT/CN2018/121908 filed Dec. 19, 2018, and claims priority to Chinese Patent Application No. 201810829219.0 filed Jul. 25, 2018, the disclosures of which are hereby incorporated by reference in their entirety.

BACKGROUND OF THE INVENTION

Field of the Invention

This disclosure relates to the field of circuits, and specifically to a Direct Current (DC) micro-grid system, a charging loop circuit and a control method thereof.

Description of Related Art

With the rapid development of energy storage systems in recent years, bidirectional converters have been getting better and better development in the field of new energy. Among others, bidirectional DC/DC converters are widely used, such as bidirectional DC/DC between DC micro-grid bus and energy storage systems in the field of distributed energy, on-board bidirectional DC/DC chargers in new energy vehicles, and bidirectional DC/DC digital power supplies in other fields.

SUMMARY OF THE INVENTION

In the first aspect, this disclosure provides a charging loop circuit, comprising: a set of switches and a charging loop, wherein: the set of switches is electrically connected to the charging loop, a first side loop of a converter, and a second side loop of the converter, respectively; and the charging loop is selectively connected to the first side loop or the second side loop through the set of switches.

In the second aspect, the present disclosure provides a DC micro-grid system, comprising: a first side loop composed of a low-voltage side device and a bidirectional DC/DC converter, a second side loop composed of a high-voltage side device and the bidirectional DC/DC converter, and the charging loop circuit as described in the first aspect.

In the third aspect, this disclosure provides a control method of a charging loop circuit of the first aspect, comprising: performing voltage sampling or current sampling on the first side loop by a first side sampling circuit of the converter, and performing voltage sampling or current sampling on the second side loop by a second side sampling circuit of the converter; controlling the set of switches to connect the charging loop to the first side loop by a control circuit of the converter if it is detected that the first side loop is powered on and the second side loop is powered off; and controlling the set of switches to connect the charging loop to the second side loop by the control circuit of the converter if it is detected that the first side loop is powered off and the second side loop is powered on.

BRIEF DESCRIPTION OF THE DRAWINGS

The drawings described herein are used to provide a further understanding of this disclosure and constitute part of the disclosure. The exemplary embodiments and description of this disclosure are used to explain the disclosure, but are not limitation thereof. In the drawings.

DETAILED DESCRIPTION OF THE INVENTION

The features and exemplary embodiments of each aspect of the present disclosure will be described in detail below. In order to make the object, technical solution and advantages of the present disclosure more clear and explicit, the present disclosure will be further described in detail in combination with the drawings and the embodiments. It should be noticed that particular embodiments described herein are merely used for explaining this disclosure, but not limitation to this disclosure. For those skilled in the art, this disclosure can be implemented without some of these specific details. The following description of the embodiments is merely to provide a better understanding of the present disclosure by showing some examples of the present disclosure.

Note that, in this description, the use of relational terms, if any, such as first and second and the like are used solely to distinguish one from another entity or action without necessarily requiring or implying any actual such relationship or order between such entities or actions. Further, terms "include", "comprise" or their any other variations are intended to encompass non-exclusive composition, so that a process, method, product or device comprising a series of factors may comprise not only these factors, but also other factors that are not listed explicitly, or factors intrinsic to this process, method, product or device. Without limitation, a factor defined by wording "comprise one . . . " does not exclude the existence of other same factors in a process, method, product or device comprising such factor.

Figure 1:
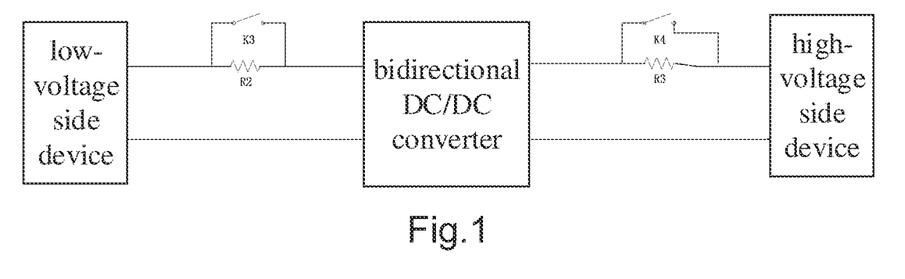
FIG. 1 is a topology diagram of a DC micro-grid energy storage system according to related technologies.

There are generally charging capacitors in bidirectional DC/DC converters. In order to avoid current impact on the components when powering on, a current popular solution is connecting charging loops at both the front and back ends of the capacitor to achieve a Soft-Start function. The traditional scheme is shown in FIG. 1. The charging loop of this scheme is pre-charged by a current-limiting resistor connected in parallel with a DC contactor or a power relay: upon power-on, due to the voltage divided on the current-limiting resistor, subsequent step-up or step-down is performed by closing the DC contactor or the power relay after charging is completed. However, this solution has many shortcomings, such as:
(1) Precharging cannot be achieved at all if the current-limiting resistor is an open circuit and malfunctions;
(2) A loss may occur due to the current-limiting resistor existed in the circuit in the case of malfunction of the DC contactor or the power relay;
(3) Both the high-voltage side and the low-voltage side are provided with charging loops, causing a waste of resources.

In view of the above shortcomings, no effective solutions have yet been proposed.

This disclosure provides a DC micro-grid system, a charging loop circuit and a control method thereof, to at least solve the problem of resource waste caused by charging loops provided on both the high-voltage side and the low-voltage side of a bidirectional DC/DC converter in the related art.

With the DC micro-grid system, the charging loop circuit and the control method thereof provided in the embodiments of the present disclosure, the charging loop is selectively connected to the first side loop or the second side loop by the set of switches, so that the problem of resource waste caused by charging loops separately provided on both sides of the converter may be solved, as a result, the number of components of the charging loop can be reduced, the costs and space can be saved, which is beneficial to optimize PCB wiring.

Figure 2:
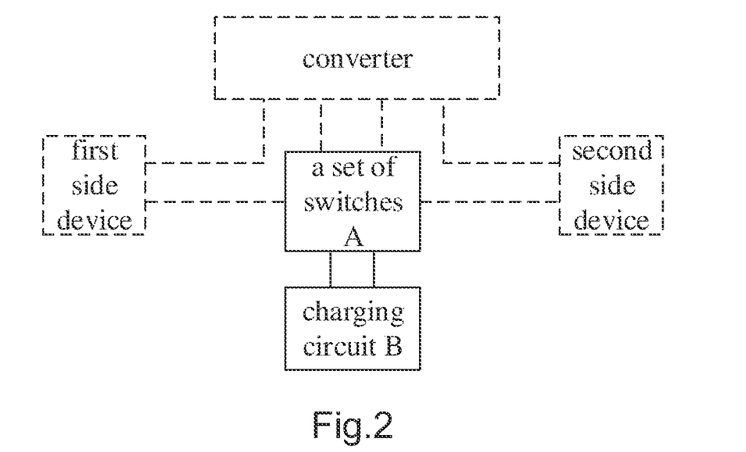
FIG. 2 is a topology diagram of a charging loop circuit according to embodiments of the present disclosure.

In this embodiment, a charging loop circuit is provided. FIG. 2 is a topological diagram of the charging loop according to embodiments of the present disclosure. The converter and other components in FIG. 2 are represented by dashed lines to indicate that these components do not belong to the components of the charging loop circuit. As shown in FIG. 2, the charging loop circuit comprises: a set of switches A and a charging loop B, wherein the set of switches A is electrically connected to the charging loop B, a first side loop, and a second side loop, respectively; and the charging loop is selectively connected to the first side loop or the second side loop through the set of switches.

The first side loop and second side loop described above represent a loop connected to one side of the converter and a loop connected to the other side of the converter, respectively. If the converter is an Alternating Current (AC)/AC converter or a DC/DC converter, the circuits on both sides of the converter are generally called a low-voltage side loop and a high-voltage side loop, respectively; if the converter is an AC/DC converter or a DC/AC converter, the circuits on both sides of the converter are generally called an AC side loop and a DC side loop, respectively.

The above set of switches A is not limited to a specific circuit, and the problem of resource waste caused by charging loops provided on both sides of the converter can be solved, as long as the charging loop can be selectively connected to the first side loop or the second side loop by switch-on and switch-off of the various switch devices in the set of switches. Since one charging loop is reduced, the number of components is reduced and the cost of the charging loop is saved.

Figure 3:
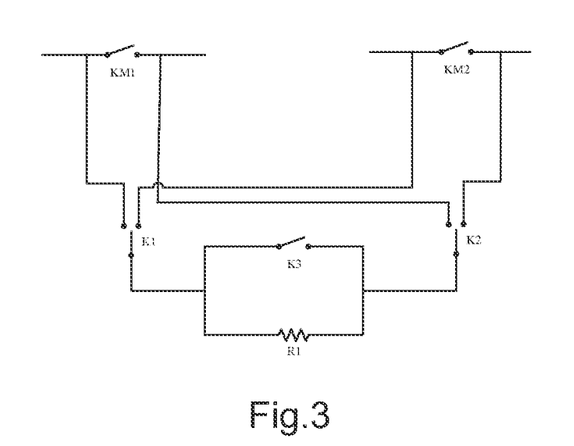
FIG. 3 is a circuit diagram 1 of a charging loop circuit according to an embodiment of the present disclosure.

In order to minimize the number of components, as well as their occupied space, in the set of switches, a circuit structure of the set of switches is provided in this embodiment. FIG. 3 is a circuit diagram of a charging loop according to an embodiment of the present disclosure. As shown in FIG. 3, the circuit comprises: a first side auxiliary contact switch KM1, a second side auxiliary contact switch KM2, a first side double-throw relay K1, a second side double-throw relay K2, and a charging loop. Wherein the charging loop is composed of a current-limiting resistor R1 and a DC contactor K3 connected in parallel, two nodes of the charging loop being electrically connected to a first contact of the first side double-throw relay K1 and a second contact of the second side double-throw relay K2, respectively.

The first side auxiliary contact switch KM1 is configured to be connected in series with a first side loop, one end of the first side auxiliary contact switch KM1 being electrically connected to a third contact of the first side double-throw relay K1, and the other end of the first side auxiliary contact switch KM1 being electrically connected to a fourth contact of the second side double-throw relay K2.

The second side auxiliary contact switch KM2 is configured to be connected in series with a second side loop, one end of the second side auxiliary contact switch KM2 being electrically connected to a fifth contact of the first side double-throw relay K1, and the other end of the second side auxiliary contact switch KM2 being electrically connected to a sixth contact of the second side double-throw relay K2.

Wherein the first side double-throw relay K1 is configured to open the first contact from the third contact or close the first contact to the third contact, or, open the first contact from the fifth contact or close the first contact to the fifth contact. The second side double-throw relay K2 is configured to open the second contact from the fourth contact or close the second contact to the fourth contact, or, open the second contact from the sixth contact or close the second contact to the sixth contact.

The charging loop of the embodiment of the present disclosure can be used in a DC micro-grid system, but is not limited to this. The present disclosure is also applicable to BUCK conversion between a high voltage level DC bus and a low voltage level DC bus, on-board bidirectional DC/DC chargers (OBC) in new energy vehicles, and other scenarios such as bidirectional DC/DC digital power supplies and bidirectional DC/DC systems that require charging loops. Moreover, the converter adopted in the charging loop circuit in this embodiment of the present disclosure may be a bidirectional DC/DC converter, but it is not limited to this. For other converters such as rectifiers and inverters, the charging loop circuit provided in this embodiment of the present disclosure can also be applied in scenarios where a charging loop is required.

Taking a DC micro-grid system as an example, the charging loop circuit provided in this embodiment can be applied in a bidirectional DC/DC converter of the DC micro-grid system. The loops on both sides of the bidirectional DC/DC converter can be any high-voltage side loop and low-voltage side loop of the DC micro-grid system. For example, the high-voltage side loop can be composed of the bidirectional DC/DC converter and one of an energy storage system, an inverter, or a high voltage DC bus. For another example, the low-voltage side loop can be composed of the bidirectional DC/DC converter and one of an energy storage system, a rectifier, or a low voltage DC bus.

Optionally, a fault-tolerant charging structure or multiple fault-tolerant charging structures are connected in parallel between two nodes of the charging loop. The fault-tolerant charging structure is used to replace the faulty current-limiting resistor R1 in the case of an open-circuit fault of the current-limiting resistor R1 to realize the charging of the energy storage capacitor of the bidirectional DC/DC converter.

Figure 4:
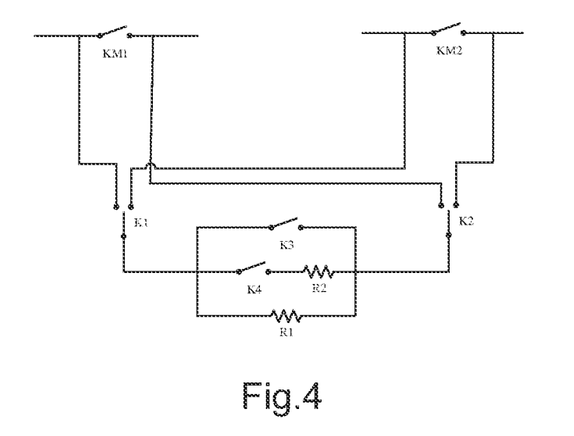
FIG. 4 is a circuit diagram 2 of a charging loop circuit according to an embodiment of the present disclosure.

As shown in FIG. 4, optionally, the above fault-tolerant charging structure or each of the multiple fault-tolerant charging structures comprises: a DC contactor K4 and a current-limiting resistor R2, wherein the DC contactor K4 is connected in series with the current-limiting resistor R2.

It should be noted that the current-limiting resistor R1 and the current-limiting resistor R2, as referred to in this embodiment, mean that the function of the resistors is current limiting, rather than a restrictive description of the performance and parameters of the resistors. For example, the current-limiting resistors can be any devices with impedance characteristics, and the current-limiting resistors can also be cement resistors or aluminum shell resistors, but are not limited to this.

Optionally, all switch devices in the set of switches are controlled to be opened or closed by a control circuit to realize automatic control. For example, the first side auxiliary contact switch KM1, the second side auxiliary contact switch KM2, the first side double-throw relay K1, the second side double-throw relay K2, the DC contactor K3, and the DC contactor K4 can all be controlled by a control circuit of the converter to be opened or closed, respectively.

It should be noted that the DC contactors, auxiliary contact switches, etc. in this embodiment can be replaced by other switch devices, and can be replaced by switch devices that can be controlled by a control circuit, for example, insulated gate bipolar transistors (referred to as IGBT), field effect transistors (MOS), or power relays.

It should be noted that the double-throw relays in this embodiment can also be replaced by other switch devices that have double switching positions and can be controlled by a control circuit.

Figure 5:
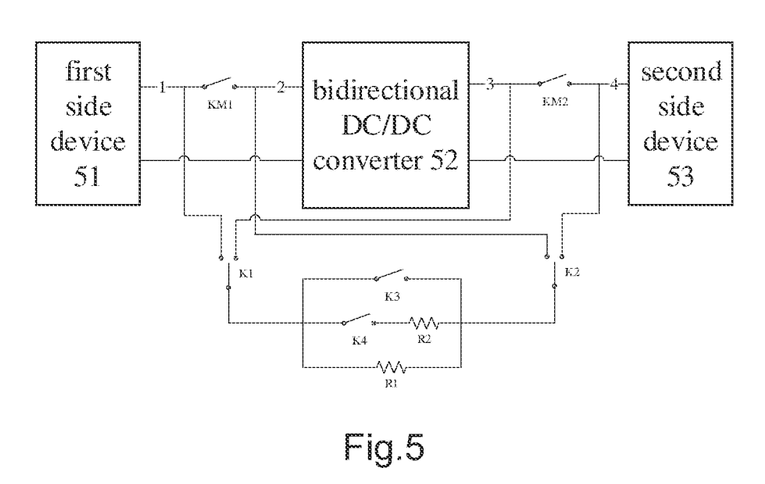
FIG. 5 is a topology diagram of a DC micro-grid system according to embodiments of the present disclosure.

In this embodiment, a DC micro-grid system is also provided. FIG. 5 is a topology diagram of a DC micro-grid system according to embodiments of the present disclosure. As shown in FIG. 5, the DC micro-grid system comprises: a first side device 51, a bidirectional DC/DC converter 52, and a second side device 53, and a charging loop circuit shown in FIG. 4. Wherein the charging loop circuit may also be a charging loop circuit with other structures described in the above embodiments, which will not be repeated herein.

Optionally, the bidirectional DC/DC converter comprises: a control circuit, a first side sampling circuit, and a second side sampling circuit.

If the first side is a low-voltage side, the opposite second side is a high-voltage side. In this case, the first side device can be one of a low-voltage side device, such as a rectifier, a low voltage DC bus, or a low voltage energy storage system; and the second side device can be one of a high-voltage side device, such as an inverter, a high voltage DC bus, or a high voltage energy storage system.

Optionally, the high-voltage side of the bidirectional DC/DC converter is provided with an energy storage capacitor, and the low-voltage side of the bidirectional DC/DC converter is or is not provided with an energy storage capacitor.

The working process of the charging loop and the charging process of the energy storage capacitor of the DC micro-grid system will be described and illustrated below in conjunction with FIG. 5.

Referring to FIG. 5, the bidirectional DC/DC converter can realize a bidirectional energy flow. The embodiment of the present disclosure integrates the low-voltage side charging loop and the high-voltage side charging loop, and two double-throw relays are adopted to switch on the high-voltage side charging loop or the low-voltage side charging loop.

When the low-voltage side (i.e. the first side) lines 1, 2 are connected to the charging loop, that is, K1 and K2 are closed to line 1 and line 2, the auxiliary contact KM1 of K1 is opened, and the auxiliary contact KM2 of K2 is closed, so that the high-voltage side (i.e., the second side) line 3 is closed to line 4. In the same way, when the high-voltage side lines 3, 4 are connected to the charging loop, the auxiliary contact KM1 of the DC contactor is closed and KM2 is opened, so that the low-voltage side line 1 is closed to line 2.

Figure 6:
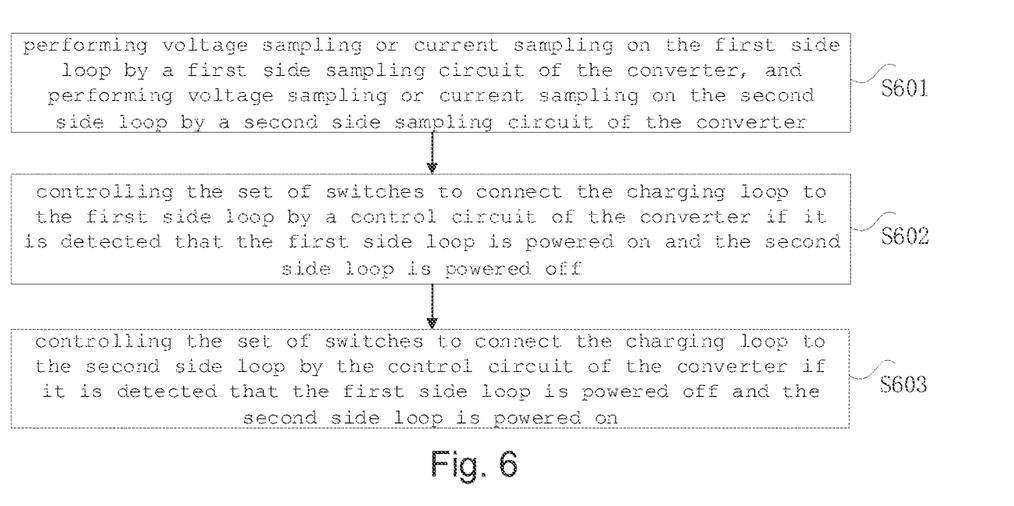
FIG. 6 is a flowchart of a control method for a charging loop circuit according to embodiments of the present disclosure.

In this embodiment, a method for controlling a charging loop circuit is also provided. FIG. 6 is a flowchart of a method for controlling a charging loop circuit according to embodiments of the present disclosure. As shown in FIG. 6, the method comprises the following steps:

step S601: performing voltage sampling or current sampling on the first side loop by a first side sampling circuit of the converter, and performing voltage sampling or current sampling on the second side loop by a second side sampling circuit of the converter;

step S602: controlling the set of switches to connect the charging loop to the first side loop by a control circuit of the converter if it is detected that the first side loop is powered on and the second side loop is powered off;

step S603: controlling the set of switches to connect the charging loop to the second side loop by the control circuit of the converter if it is detected that the first side loop is powered off and the second side loop is powered on.

Optionally, the control circuit is a main control digital signal processing (referred to as DSP) chip of the bidirectional DC/DC converter.

This function is aimed at the waste of device resources and layout space on the Printed Circuit Board (PCB) in the case where there are charging loops on both the high-voltage side and the low-voltage side. Considering that the trend of PCB is miniaturization and lightness, how to make the PCB smaller is an important thing. Merely reducing the spacing between components is not enough to solve the problem. Moreover, it may cause the danger of too small electrical safety distance and creepage distance, so component selection and integration of replicated components are effective solutions. The embodiment of the present disclosure integrates the same charging loops on the high-voltage side and the low-voltage side, effectively reducing the number of components and facilitating PCB layout. Through the above improvement, with the program control in the main control DSP chip, the low-voltage side and the high-voltage side can be charged separately.

In addition, the charging loop circuit of the embodiment of the present disclosure can not only reduce the number of components and save costs, from the standpoint of a separate charging loop, it can also avoid the damage and danger caused by failures of components in the charging loop circuit.

Figure 7:
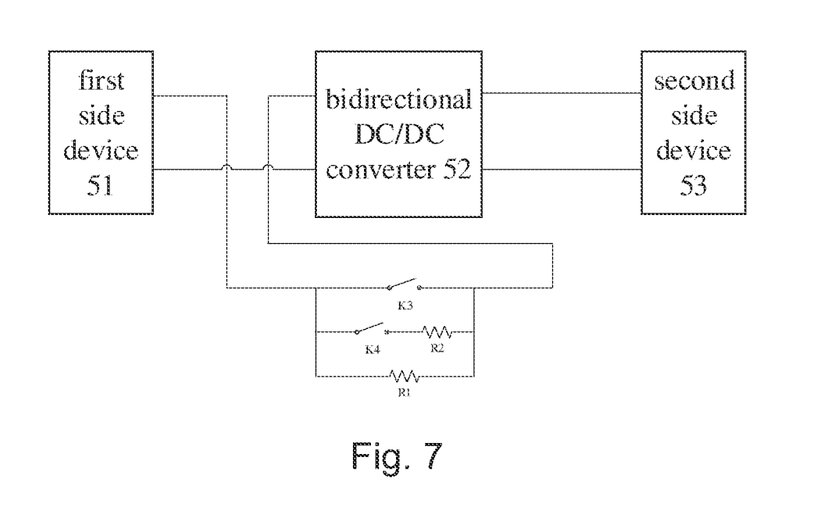
FIG. 7 is a topology diagram of a DC micro-grid energy storage system in which a low-voltage side charging loop is switched on according to embodiments of the present disclosure.
Figure 8:
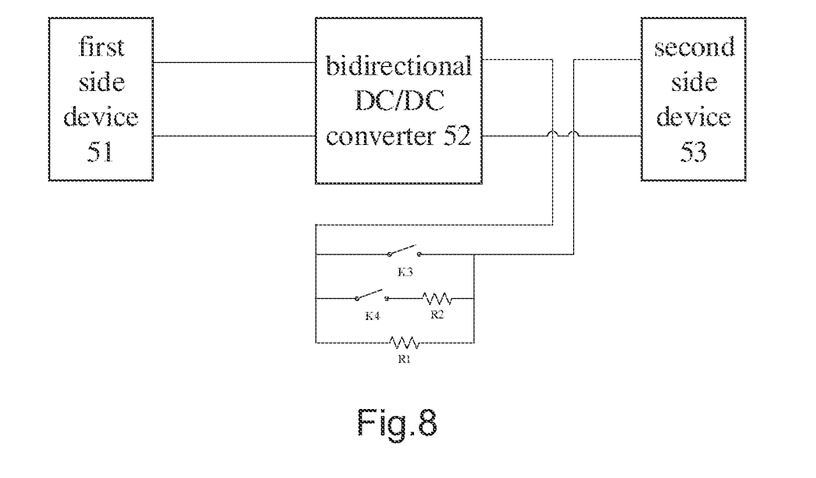
FIG. 8 is a topology diagram of a DC micro-grid energy storage system in which a high-voltage side charging loop is switched on according to embodiments of the present disclosure.

Taking a situation where the first side device 51 is a low-voltage energy storage system, the second side device 53 is a high-voltage DC bus, and the low-voltage side is connected to the charging loop as an example, as shown in FIGS. 7, K3 and K4 are DC contactors, and R1 and R2 are current limiting resistors.

(1) When the energy storage system is powered on from the low-voltage side, the electric energy first charges the energy storage capacitor of the bidirectional DC/DC converter through the current limiting resistor R1. When the charging voltage reaches a required voltage, the DC contactor K3 is closed to bypass the current-limiting resistor R1 to avoid unnecessary loss caused by R1 in the circuit, which otherwise may affect the efficiency of the converter.

(2) If the current-limiting resistor R1 is an open circuit and malfunctions, software controls to enable the "DC contactor K4+current-limiting resistor R2" for charging. after the charging voltage reaches a required voltage, the DC contactor K3 is closed while K4 remains closed; or after the charging voltage reaches a required voltage, the DC contactor K3 is closed, and K4 is opened to cut off the current limiting resistor.

(3) If the DC contactor K3 fails, the software controls to close the auxiliary contact KM1 to avoid the loss caused by the current limiting resistor R1 existed in the circuit.

(4) If the current-limiting resistor R2 does not fail, the charging speed can be controlled by the parallel connection of "DC contactor K4+current-limiting resistor R1" and the current-limiting resistor R2. The current-limiting resistor 1 and the current-limiting resistor 2 have the same resistance value. In the case where K4 is closed, the equivalent charging resistance value of these two parallel-connected resistors is reduced to ½ of the original resistance value, so the charging speed is doubled.

$$T=RC/0.434\{\log[\xi(\xi-Uc)]\}$$

Wherein: $\xi$ is a constant, which is related to the capacitor itself. Uc is a set value of the charging voltage of the system. C is the capacity of the energy storage capacitor. Upon the determination of other parameters, the charging time is only related to the current-limiting resistance value. So the charging time is shortened as the current limiting resistance value is reduced.

In summary, with the DC micro-grid system, the charging loop circuit and the control method for the above embodiments of the present disclosure, on the one hand, it is possible to avoid impact on the energy storage capacitor of the converter in the case of failures of critical components, and to ensure the reliability of the charging loop circuit. On the other hand, the low-voltage side and high-voltage side charging loop circuits are optimized by means of double-throw relays. Only one charging loop is used, so that resources are saved and costs are reduced.

The above description is only embodiments of the present disclosure and is not intended to limit the present disclosure. For those skilled in the art, the present disclosure may have various modifications and changes. Any modifications, equivalent replacements, or improvements made within the spirit and principle of the present disclosure shall be included in the scope of the present disclosure.

What is claimed is:

1. A charging loop circuit, comprising a set of switches and a charging loop, wherein:
   the set of switches is electrically connected to the charging loop, a first side loop of a converter and a second side loop of the converter, respectively; and
   the charging loop is selectively connected to the first side loop or the second side loop through the set of switches;
   wherein the set of switches comprises a switch denoted as KM1, a switch denoted as KM2, a double-throw switch denoted as K1, and a double-throw switch denoted as K2, wherein:
   two nodes of the charging loop are electrically connected to a first contact of the double-throw switch denoted as K1 and a second contact of the double-throw switch denoted as K2, respectively;
   the switch denoted as KM1 is configured to be connected in series with the first side loop, and an end of the switch denoted as KM1 is electrically connected with a third contact of the double-throw switch denoted as K1, and another end of the switch denoted as KM1 is electrically connected to a fourth contact of the double-throw switch denoted as K2;
   the switch denoted as KM2 is configured to be connected in series with the second side loop, and an end of the switch denoted as KM2 is electrically connected with a fifth contact of the double-throw switch denoted as K1, and another end of the switch denoted as KM2 is electrically connected with a sixth contact of the double-throw switch denoted as K2; and
   wherein the double-throw switch denoted as K1 is configured to open the first contact from the third contact or close the first contact to the third contact, or, open the first contact from the fifth contact or close the first contact to the fifth contact; and the double-throw switch denoted as K2 is configured to open the second contact from the fourth contact or close the second contact to the fourth contact, or, open the second contact from the sixth contact or close the second contact to the sixth contact.

2. The charging loop circuit according to claim 1, wherein all switch devices in the set of switches are controlled to be opened or closed by a control circuit.

3. The charging loop circuit according to claim 1, wherein the charging loop comprises a resistor denoted as R1 and a switch denoted as K3 connected in parallel.

4. The charging loop circuit according to claim 1, wherein one or more fault-tolerant charging structures are connected in parallel between two nodes of the charging loop, wherein the fault-tolerant charging structure comprises a switch denoted as K4 and a resistor denoted as R2 connected in series.

5. The charging loop circuit according to claim 1, wherein the switch denoted as KM1, the switch denoted as KM2, the switch denoted as K3 or the switch denoted as K4 is one of an insulated gate bipolar transistor (IGBT), a field effect transistor Metal-Oxide-Semiconductor (MOS), or a power relay.

6. The charging loop circuit according to claim 5, wherein the double-throw switch denoted as K1 and the double-throw switch denoted as K2 are double-throw relays.

7. The charging loop circuit according to claim 1, wherein the converter comprises one of a rectifier, an inverter, or a bidirectional Direct Current/Direct Current (DC/DC) converter.

8. The charging loop circuit according to claim 7, wherein if the converter is a bidirectional DC/DC converter,
   the first side loop comprises the bidirectional DC/DC converter and one of an energy storage system, a rectifier, or a low-voltage DC bus; and
   the second side loop comprises the bidirectional DC/DC converter and one of an energy storage system, an inverter, or a high voltage DC bus.

9. A Direct Current (DC) micro-grid system, wherein the DC micro-grid system comprises: a first side loop composed of a low-voltage side device and a bidirectional DC/DC converter, a second side loop composed of a high-voltage side device and the bidirectional DC/DC converter, and the charging loop circuit according to claim 1.

10. The DC micro-grid system according to claim 9, wherein the bidirectional DC/DC converter comprises: a control circuit, a first side sampling circuit, and a second side sampling circuit.

11. A control method for a charging loop circuit according to claim 1, comprising:

performing voltage sampling or current sampling on the first side loop by a first side sampling circuit of the converter, and performing voltage sampling or current sampling on the second side loop by a second side sampling circuit of the converter;

controlling the set of switches to connect the charging loop to the first side loop by a control circuit of the converter if it is detected that the first side loop is powered on and the second side loop is powered off; and controlling the set of switches to connect the charging loop to the second side loop by the control circuit of the converter if it is detected that the first side loop is powered off and the second side loop is powered on.

12. A Direct Current (DC) micro-grid system, comprising: a first side circuit composed of a low-voltage side device and a bidirectional DC/DC converter, a second side circuit composed of a high-voltage side device and the bidirectional DC/DC converter, and the charging loop circuit according to claim 2.

13. A Direct Current (DC) micro-grid system, comprising: a first side circuit composed of a low-voltage side device and a bidirectional DC/DC converter, a second side circuit composed of a high-voltage side device and the bidirectional DC/DC converter, and the charging loop circuit according to claim 3.

14. A Direct Current (DC) micro-grid system, comprising: a first side circuit composed of a low-voltage side device and a bidirectional DC/DC converter, a second side circuit composed of a high-voltage side device and the bidirectional DC/DC converter, and the charging loop circuit according to claim 4.

15. A Direct Current (DC) micro-grid system, comprising: a first side circuit composed of a low-voltage side device and a bidirectional DC/DC converter, a second side circuit composed of a high-voltage side device and the bidirectional DC/DC converter, and the charging loop circuit according to claim 1.

16. A Direct Current (DC) micro-grid system, comprising: a first side circuit composed of a low-voltage side device and a bidirectional DC/DC converter, a second side circuit composed of a high-voltage side device and the bidirectional DC/DC converter, and the charging loop circuit according to claim 5.

17. A Direct Current (DC) micro-grid system, comprising: a first side circuit composed of a low-voltage side device and a bidirectional DC/DC converter, a second side circuit composed of a high-voltage side device and the bidirectional DC/DC converter, and the charging loop circuit according to claim 6.

18. A Direct Current (DC) micro-grid system, comprising: a first side circuit composed of a low-voltage side device and a bidirectional DC/DC converter, a second side circuit composed of a high-voltage side device and the bidirectional DC/DC converter, and the charging loop circuit according to claim 7.

19. A Direct Current (DC) micro-grid system, comprising: a first side circuit composed of a low-voltage side device and a bidirectional DC/DC converter, a second side circuit composed of a high-voltage side device and the bidirectional DC/DC converter, and the charging loop circuit according to claim 8.

* * * * *

UNITED STATES PATENT AND TRADEMARK OFFICE
CERTIFICATE OF CORRECTION

PATENT NO. : 11,929,634 B2
APPLICATION NO. : 17/261916
DATED : March 12, 2024
INVENTOR(S) : Shiyong Jiang et al.

It is certified that error appears in the above-identified patent and that said Letters Patent is hereby corrected as shown below:

In the Claims

Column 7, Line 53, Claim 1, delete "converter" and insert -- converter, --

Column 8, Line 41, Claim 6, delete "claim 5," and insert -- claim 1, --

Signed and Sealed this
Seventh Day of May, 2024

Katherine Kelly Vidal
*Director of the United States Patent and Trademark Office*